(12) United States Patent
Suciu et al.

(10) Patent No.: US 9,273,563 B2
(45) Date of Patent: *Mar. 1, 2016

(54) INTEGRALLY BLADED ROTOR WITH SLOTTED OUTER RIM

(75) Inventors: Gabriel L. Suciu, Glastonbury, CT (US); James W. Norris, Lebanon, CT (US)

(73) Assignee: United Technologies Corporation, Hartford, CT (US)

( * ) Notice: Subject to any disclaimer, the term of this patent is extended or adjusted under 35 U.S.C. 154(b) by 756 days.

This patent is subject to a terminal disclaimer.

(21) Appl. No.: 13/585,068

(22) Filed: Aug. 14, 2012

(65) Prior Publication Data

US 2012/0308381 A1 Dec. 6, 2012

Related U.S. Application Data

(63) Continuation-in-part of application No. 11/965,883, filed on Dec. 28, 2007, now Pat. No. 9,133,720.

(51) Int. Cl.

| F01D 5/34 | (2006.01) |
| F01D 5/08 | (2006.01) |
| F01D 11/00 | (2006.01) |
| F04D 29/32 | (2006.01) |

(52) U.S. Cl.
CPC *F01D 5/34* (2013.01); *F01D 5/084* (2013.01); *F01D 11/006* (2013.01); *F04D 29/321* (2013.01); *F04D 29/322* (2013.01); *F04D 29/329* (2013.01); *F05D 2230/10* (2013.01); *F05D 2230/12* (2013.01); *F05D 2260/941* (2013.01); *Y02T 50/671* (2013.01); *Y02T 50/673* (2013.01); *Y02T 50/676* (2013.01)

(58) Field of Classification Search
CPC ............. F01D 5/10; F01D 5/34; F01D 5/084; F01D 11/006; F05D 2260/94; F05D 2260/941; F04D 29/329; F04D 29/321; F04D 29/322
See application file for complete search history.

(56) References Cited

U.S. PATENT DOCUMENTS

| 737,042 A | 8/1903 | Stumpf |
| 2,623,727 A | 12/1952 | McLeod |
| 3,847,506 A | 11/1974 | Straniti |
| 3,897,171 A | 7/1975 | Stahl |
| 4,685,863 A | 8/1987 | McLean |
| 4,813,848 A | 3/1989 | Novotny |

(Continued)

OTHER PUBLICATIONS

International Preliminary Report on Patentability for PCT Application No. PCT/US2013/053752 mailed on Feb. 26, 2015.

(Continued)

*Primary Examiner* — Craig Kim
*Assistant Examiner* — Adam W Brown
(74) *Attorney, Agent, or Firm* — Carlson, Gaskey & Olds, PC

(57) ABSTRACT

An integrally bladed rotor has an outer rim with a plurality of blades extending radially outwardly of the outer rim. A plurality of channels are formed radially inwardly of the outer rim. A discontinuity formed at a radially outer surface of the outer rim includes a first thin slot at a radially outer face of the outer rim with an enlarged seal holding area. A second thin slot is positioned radially inwardly of the seal holding. The first and second thin slots are thinner circumferentially than the enlarged seal holding area. A seal is inserted into the seal holding area. The seal does not extend into the first and second thin slots, nor into the channels.

19 Claims, 4 Drawing Sheets

(56) References Cited

U.S. PATENT DOCUMENTS

| | | | |
|---|---|---|---|
| 5,292,385 A | | 3/1994 | Kington |
| 6,312,218 B1 | | 11/2001 | Beeck et al. |
| 2001/0019695 A1 | * | 9/2001 | Correia .......................... 415/135 |
| 2006/0039791 A1 | | 2/2006 | Kim |
| 2006/0099078 A1 | | 5/2006 | Rice et al. |
| 2008/0304972 A1 | * | 12/2008 | Xiao ............................. 416/203 |
| 2010/0239422 A1 | * | 9/2010 | Reyes et al. ............... 416/204 A |
| 2011/0182745 A1 | | 7/2011 | Suciu et al. |

OTHER PUBLICATIONS

International Search Report and Written Opinion for International Application No. PCT/US2013/053752 completed on Jul. 17, 2014.

Singapore Search Report for Singapore Patent Application No. 11201500961R mailed Sep. 7, 2015.

* cited by examiner

INTEGRALLY BLADED ROTOR WITH SLOTTED OUTER RIM

RELATED APPLICATIONS

This application is a continuation-in-part of U.S. Ser. No. 11/965,883 filed Dec. 28, 2007 now U.S. Pat. No. 9,133,720.

BACKGROUND OF THE INVENTION

This application relates to an integrally bladed rotor, such as utilized in gas turbine engines, wherein an outer rim has a discontinuity.

Gas turbine engines typically include a plurality of sections mounted in series. A fan section may deliver air to a compressor section. The compressor section may include high and low compression stages, and delivers compressed air to a combustion section. The air is mixed with fuel in the combustion section and burned. Products of this combustion are passed downstream over turbine rotors.

The compressor section includes a plurality of rotors having a plurality of circumferentially spaced blades. Recently, these rotors and blades have been formed as an integral component, called an "integrally bladed rotor."

In one known integrally bladed rotor, blades extend from an outer rim. The outer rim in integrally bladed rotors is subject to a number of stresses, and in particular, hoop stresses. The hoop stresses can cause the life of the integrally bladed rotor to be reduced due to thermal fatigue.

SUMMARY OF THE INVENTION

In a featured embodiment, an integrally bladed rotor has an outer rim with a plurality of blades extending radially outwardly of the outer rim. A plurality of channels are formed radially inwardly of the outer rim. A discontinuity is formed at a radially outer surface of the outer rim, including a first thin slot at a radially outer face of the outer rim with an enlarged seal holding area. A second thin slot is positioned radially inwardly of the seal holding. The first and second thin slots are thinner circumferentially than the enlarged seal holding area. A seal is inserted into the seal holding area, but does not extend into the first and second thin slots nor into the channels.

In another embodiment according to the previous embodiment, there are a plurality of discontinuities formed between the blades.

In another embodiment according to any of the previous embodiments, the discontinuity is formed non-parallel to a blade stacking line of the blades.

In another embodiment according to any of the previous embodiments, the discontinuity is formed non-parallel to a central axis of the integrally bladed rotor.

In another embodiment according to any of the previous embodiments, the discontinuity is formed such that it shields a leading edge of one of the blades and a trailing edge of the adjacent blade.

In another embodiment according to any of the previous embodiments, the channels are formed non-parallel to a blade stacking line of the blades.

In another embodiment according to any of the previous embodiments, the channels are formed non-parallel to a central axis of the integrally bladed rotor.

In another embodiment according to any of the previous embodiments, the channels are formed radially inward of the blades.

In another embodiment according to any of the previous embodiments, the channels include a first essentially flat portion on a radially inward side of the channel, and a second essentially flat portion on a radially outward side of the channel.

In another embodiment according to any of the previous embodiments, the leading edges and trailing edges of the blades are softened.

In another featured embodiment, a gas turbine engine has a compressor section including at least one rotor with a plurality of blades. The blades are non-parallel to a central axis of said integrally bladed rotor, with the at least one rotor being an integrally bladed rotor. The compressor delivers compressed air downstream into a combustion section. The combustion section delivers products of combustion downstream across a turbine rotor.

In another embodiment according to the previous embodiment, the integrally bladed rotor of the compression section has an outer rim with a plurality of blades extending radially outwardly of the outer rim. A discontinuity is formed at a radially outer surface of the outer rim, including a first thin slot at a radially outer face of the outer rim with an enlarged seal holding area. A second thin slot is positioned radially inwardly of the seal holding. The first and second thin slots are thinner circumferentially than the enlarged seal holding area. A seal is inserted into the seal holding area but does not extend into the first and second thin slots nor into the channels. A plurality of channels is formed radially inwardly of the outer rim.

In another embodiment according to any of the previous embodiments, there are a plurality of discontinuities formed between the blades.

In another embodiment according to any of the previous embodiments, the discontinuity is formed non-parallel to a blade stacking line of the blades.

In another embodiment according to any of the previous embodiments, the discontinuity is formed non-parallel to a central axis of the integrally bladed rotor.

In another embodiment according to any of the previous embodiments, the discontinuity is formed such that it shields a leading edge of one of the blades and a trailing edge of the adjacent blade.

In another embodiment according to any of the previous embodiments, the channels are formed non-parallel to a blade stacking line of the blades.

In another embodiment according to any of the previous embodiments, the channels are formed non-parallel to a central axis of the integrally bladed rotor.

In another embodiment according to any of the previous embodiments, the channels are formed radially inward of a leading edge of the blades and a trailing edge of the blades.

In another embodiment according to any of the previous embodiments, the channels include a first essentially flat portion on a radially inward side of the channel, and a second essentially flat portion on a radially outward side of the channel.

In another featured embodiment, an integrally bladed rotor has an outer rim with a plurality of blades extending radially outwardly of the outer rim. A plurality of channels is formed radially inwardly of the outer rim. A plurality of discontinuities is formed at a radially outer surface of the outer rim and between the blades, each including a first thin slot at a radially outer face of the outer rim with an enlarged seal holding area. A second thin slot is positioned radially inwardly of the seal holding area. The first and second thin slots are thinner circumferentially than the seal holding area. A seal is inserted into the seal holding area but does not extend into the first and second thin slots nor into the channels. The discontinuities are formed non-parallel to a blade stacking line of the blades. The discontinuities are formed non-parallel to a central axis of the integrally bladed rotor The channels are formed non-parallel to a blade stacking line of the blades. The channels are formed non-parallel to a central axis of the integrally bladed rotor. The channels include a first essentially flat portion on a radially inward side of the channel, and a second essentially flat portion on a radially outward side of the channel.

These and other features of the present invention can be best understood from the following specification and drawings, the following of which is a brief description.

DETAILED DESCRIPTION

Figure 1:
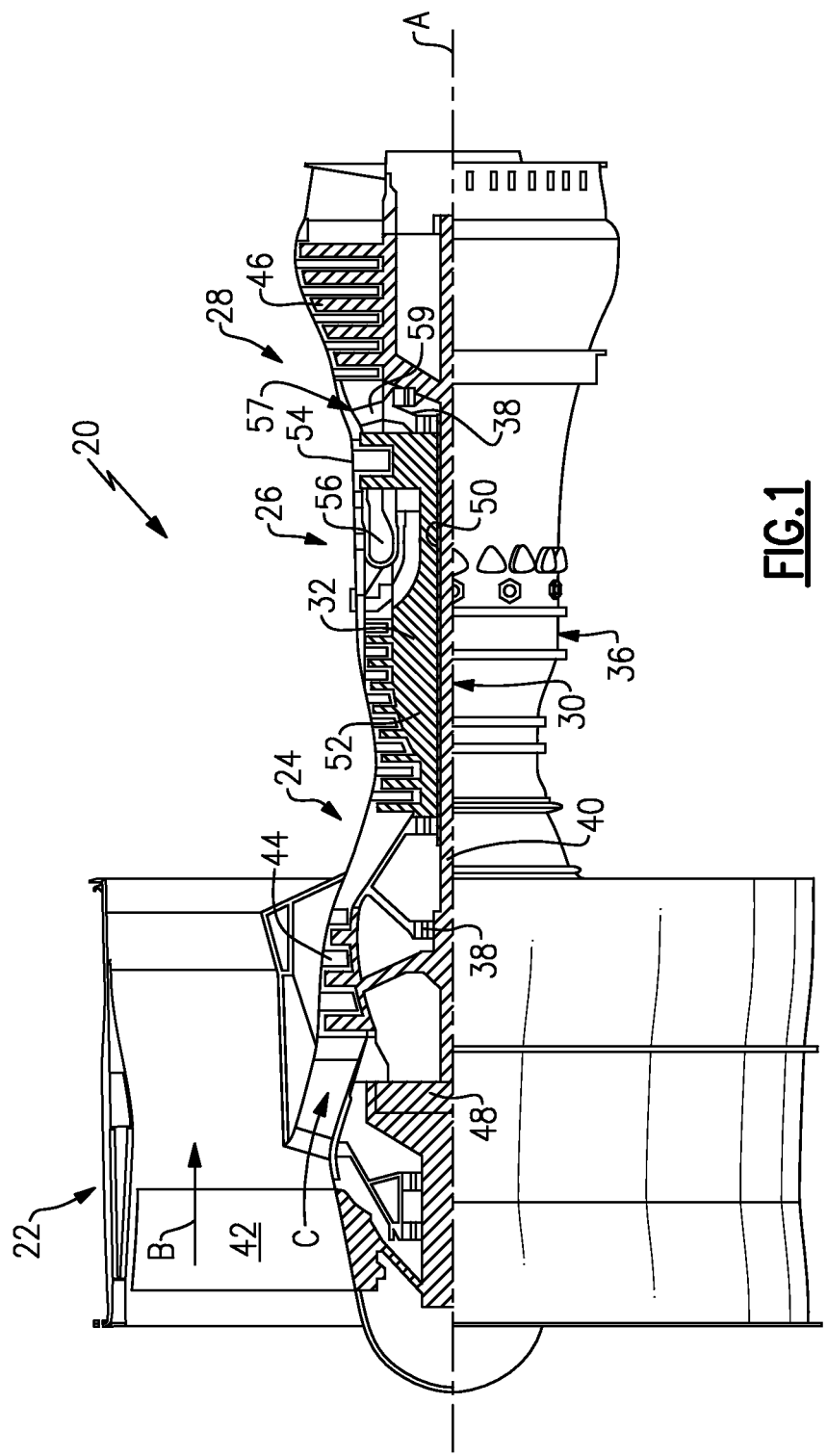
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
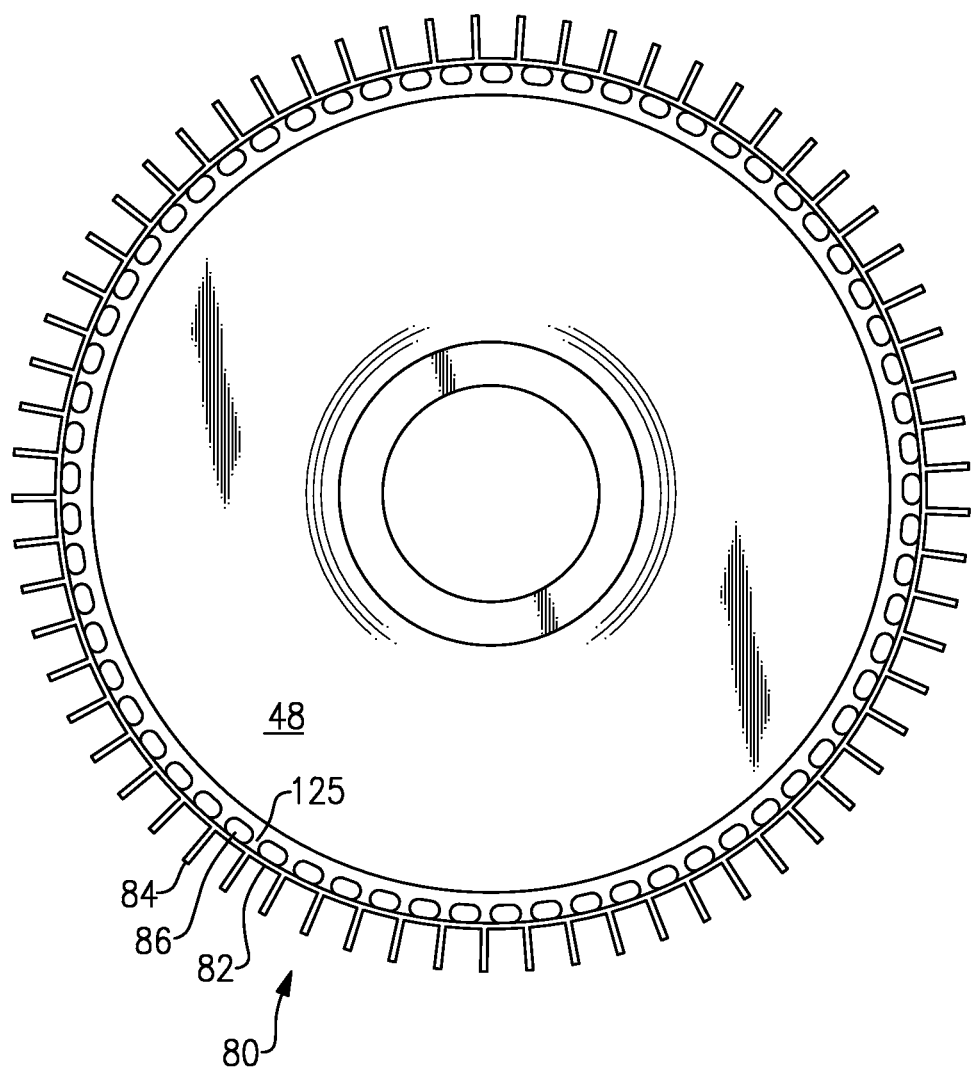
FIG. 2 shows an integrally bladed rotor according to an embodiment of the present invention.

FIG. 2 shows an integrally bladed rotor 80, such as may be utilized for the high stage compression section. The integrally bladed rotor 80 includes an outer rim 82, a plurality of circumferentially distributed blades 84, a central hub 48, and a plurality of channels 86. The channels 86 extend through the axial width of the rotor 80. The radial dimension of lugs 125 between channels 86 is small in order to reduce dead weight outside of the outer rim 82.

Channels 86 and discontinuities 88, 90 and 92 (see FIGS. 3 through 5) address the hoop stresses discussed earlier.

Figure 3:
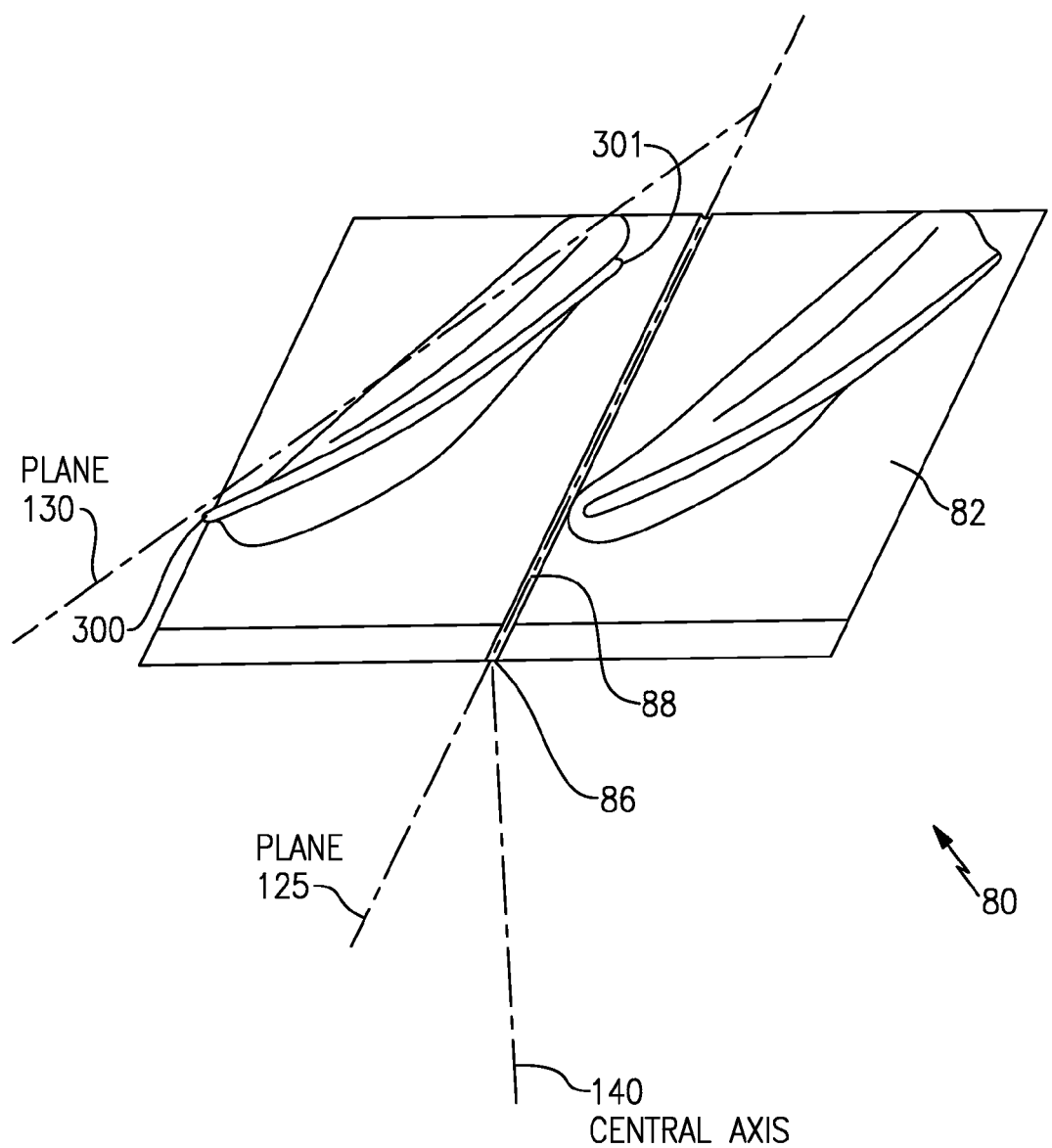
FIG. 3 shows a perspective of the FIG. 2 inventive integrally bladed rotor.

As is clear from FIG. 3, the discontinuity 88 and channel 86 lies on plane 125. The aerodynamic stacking line of the blades 84 and associated airfoils lie on plane 130. Planes 125 and 130 are not parallel to one another or the central axis 140 of the integrally bladed rotor 80. This arrangement serves to relieve stress on the leading 300 and trailing 301 edges of the blades 84 while still providing support for the center of the integrally bladed rotor 80. The angle of the discontinuities 88 on plane 125 relative to the aerodynamic stacking line of the blades 84 on plane 130 can allow the discontinuity to shield the leading edge 300 of one blade from stress and the trailing edge 301 of the adjacent blade from stress.

Figure 4A:
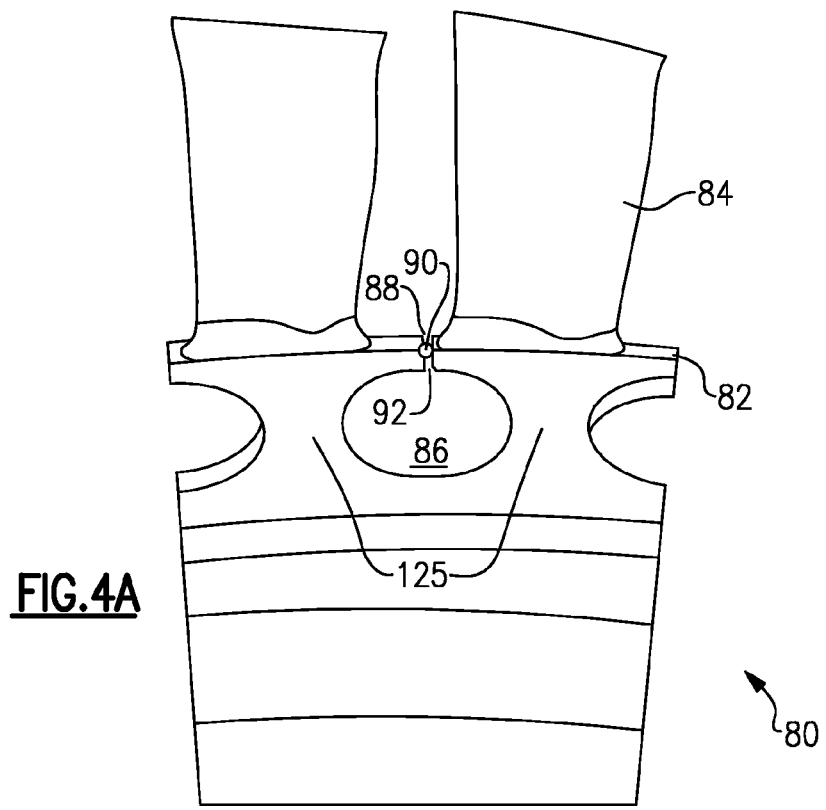
FIG. 4A is a detail view of the FIG. 2 integrally bladed rotor.

FIG. 4A shows integrally bladed rotor 80. In integrally bladed rotor 80, a discontinuity 88, 90, 92 is formed through a radial extent of the outer rim 82.

As shown, a central enlarged, seal holding portion 90 is formed between two smaller slots 88 and 92. As can be appreciated from FIGS. 4A-B, a radially inner slot 92 extends to the channel 86. As is clear from FIGS. 4A-B, the slots 88 and 92 extend for a thinner circumferential extent than does a seal holding portion 90.

Figure 4B:
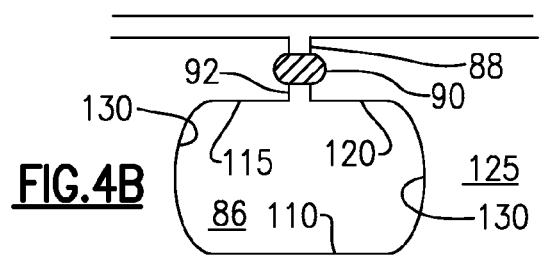
FIG. 4B shows a further detail of FIG. 4A.

As is shown in FIG. 3 and FIGS. 4A-B, the cavities 86 are formed radially inward from the blades 84. The edges of the blades are softened in order to reduce thermally driven stresses at the edges and reduce the thickness of the outer rim 82.

FIG. 4B shows that the channels 86 have a modified oval shape. The channel has essentially flat portions 115 and 120 where it meets the outer rim 82 on the radially outer side. The channel 86 also has an essentially flat portion 110 on the radially inner side. Curved edges 130 connect the essentially flat portions. These essentially flat portions serve to reduce the high stresses due to centrifugal force at these areas. Other modified shapes with essentially flat portions could be used as well.

Figure 5:
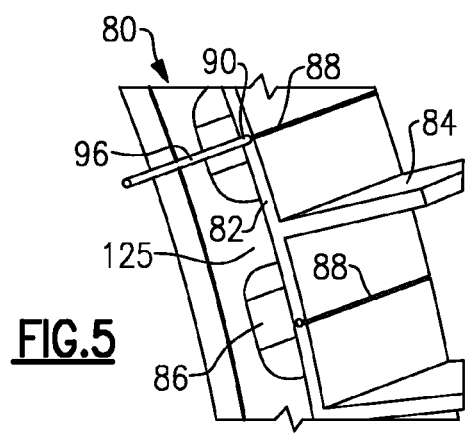
FIG. 5 shows a perspective of the FIG. 4 integrally bladed rotor.

As shown in FIG. 5, the outer slot 88 extends across the axial width of the rotor 80. Seals 96 may be inserted in the enlarged portion 90 of the discontinuity. The seal 96 is shown as a wire seal, however, other seals, such as brush seals, W seals or feather seals, may be utilized. The seals prevent recirculation of gases from the radially outer face of the outer rim 82 into the channels 86. As is clear from FIG. 5, the seal material 96 is inserted into the seal holding portion 90, and not into the slots 88 and 92. In addition, the channel 86 does not receive the seal material.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An integrally bladed rotor comprising:
   an outer rim having a plurality of blades extending radially outwardly of said outer rim;
   a plurality of channels being formed radially inwardly of said outer rim; and
   a discontinuity formed at a radially outer surface of said outer rim, including a first thin slot at a radially outer face of said outer rim with an enlarged seal holding area, a second thin slot positioned radially inwardly of said enlarged seal holding area, said first and second thin slots being thinner circumferentially than said enlarged seal holding area, and a seal inserted into said enlarged seal holding area, said seal not extending into said first and second thin slots and said seal not extending into said channels.

2. The integrally bladed rotor as set forth in claim 1, wherein there are a plurality of discontinuities formed between said blades.

3. The integrally bladed rotor as set forth in claim 1, wherein said discontinuity is formed non-parallel to a blade stacking line of said blades.

4. The integrally bladed rotor as set forth in claim 1, wherein said discontinuity is formed non-parallel to a central axis of said integrally bladed rotor.

5. The integrally bladed rotor as set forth in claim 1, wherein said discontinuity is formed such that it shields a leading edge of one of said blades and a trailing edge of the adjacent blade.

6. The integrally bladed rotor as set forth in claim 1, wherein said channels are formed non-parallel to a blade stacking line of said blades.

7. The integrally bladed rotor as set forth in claim 1, wherein said channels are formed non-parallel to a central axis of said integrally bladed rotor.

8. The integrally bladed rotor as set forth in claim 1, wherein said channels are formed radially inward of a location of said blades.

9. The integrally bladed rotor as set forth in claim 1, wherein said channels include a first essentially flat portion on a radially inward side of said channel, and a second essentially flat portion on a radially outward side of said channel.

10. A gas turbine engine comprising:
    a compressor section including at least one integrally bladed rotor having a plurality of blades, said blades not being parallel to a central axis of said integrally bladed rotor;
    said compressor for delivering compressed air downstream into a combustion section, said combustion section for delivering products of combustion downstream across a turbine rotor; and
    said integrally bladed rotor of said compression section including
    an outer rim having a plurality of blades extending radially outwardly of said outer rim;
    a plurality of channels being formed radially inwardly of said outer rim; and
    a discontinuity being formed at a radially outer surface of said outer rim, including a first thin slot at a radially outer face of said outer rim with an enlarged seal holding area, a second thin slot positioned radially inwardly of said enlarged seal holding area, said first and second thin slots being thinner circumferentially than said enlarged seal holding area, and a seal inserted into said enlarged seal holding area, said seal not extending into said first and second thin slots and said seal not extending into said channels.

11. The gas turbine engine as set forth in claim 10, wherein there are a plurality of discontinuities formed between said blades.

12. The gas turbine engine as set forth in claim 10, wherein said discontinuity is formed non-parallel to a blade stacking line of said blades.

13. The gas turbine engine as set forth in claim 10, wherein said discontinuity is formed non-parallel to a central axis of said integrally bladed rotor.

14. The gas turbine engine as set forth in claim 10, wherein said discontinuity is formed such that it shields a leading edge of one of said blades and a trailing edge of the adjacent blade.

15. The gas turbine engine as set forth in claim 10, wherein said channels are formed non-parallel to a blade stacking line of said blades.

16. The gas turbine engine as set forth in claim 10, wherein said channels are formed non-parallel to a central axis of said integrally bladed rotor.

17. The gas turbine engine as set forth in claim 10, wherein said channels are formed radially inward of locations of a leading edge of said blades and a trailing edge of said blades.

18. The gas turbine engine as set forth in claim 10, wherein said channels include a first essentially flat portion on a radially inward side of said channel, and a second essentially flat portion on a radially outward side of said channel.

19. An integrally bladed rotor comprising:

an outer rim having a plurality of blades extending radially outwardly of said outer rim;

a plurality of channels being formed radially inwardly of said outer rim;

a plurality of discontinuities formed at a radially outer surface of said outer rim and between said blades, each, including a first thin slot at a radially outer face of said outer rim with an enlarged seal holding area, a second thin slot positioned radially inwardly of said enlarged seal holding area, said first and second thin slots being thinner circumferentially than said enlarged seal holding area, and a seal inserted into said enlarged seal holding area, said seal not extending into said first and second thin slots and said seal not extending into said channels;

said discontinuities being formed non-parallel to a blade stacking line of said blades;

said discontinuities being formed non-parallel to a central axis of said integrally bladed rotor;

said channels formed non-parallel to a blade stacking line of said blades;

said channels formed non-parallel to a central axis of said integrally bladed rotor; and said channels including a first essentially flat portion on a radially inward side of said channel, and a second essentially flat portion on a radially outward side of said channel.

\* \* \* \* \*